United States Patent [19]

Hasegawa et al.

[11] Patent Number: 5,562,157
[45] Date of Patent: Oct. 8, 1996

[54] HEAT EXCHANGER

[75] Inventors: Etuo Hasegawa, Kounan; Toshiya Nagasawa, Obu; Shogo Sumi, Toyoake, all of Japan

[73] Assignee: Nippondenso Co., Ltd., Kariya, Japan

[21] Appl. No.: 536,241

[22] Filed: Sep. 29, 1995

[30] Foreign Application Priority Data

Sep. 30, 1994 [JP] Japan .................................. 6-237326

[51] Int. Cl.$^6$ ...................................... F28D 1/03
[52] U.S. Cl. ......................... 165/144; 165/153; 165/176; 62/515
[58] Field of Search ................... 165/144, 145, 165/153, 167, 176; 62/515, 526

[56] References Cited

U.S. PATENT DOCUMENTS

| | | | |
|---|---|---|---|
| 4,002,201 | 1/1977 | Donaldson | 165/167 X |
| 4,327,802 | 5/1982 | Beldam | 165/153 |

FOREIGN PATENT DOCUMENTS

| | | | |
|---|---|---|---|
| 5-106939 | 4/1993 | Japan | 62/515 |

*Primary Examiner*—Leonard R. Leo

*Attorney, Agent, or Firm*—Cushman, Darby & Cushman

[57] ABSTRACT

A laminate type heat exchanger is formed from a plurality of plates and integrally brazed and joined. This heat exchanger includes a joint block, a refrigerant heat-exchanging portion which causes heat exchange between refrigerants, and an evaporating portion which causes heat exchange between refrigerant and passenger-compartment air. The inventors formulated new index to perform successful integral brazing. A reference volume of a portion is a volume of the portion providing a predetermined amount of heat-receiving surface area of the portion, an index A of the portion is defined by A=(volume of material of the portion to be heated existing in a reference volume of the portion)/(the reference volume of the portion), and a ratio of an index A1 which is the index A of the first portion and an index A2 which is the index A of the second portion, i.e., A1/A2 is set within a certain range. Preferably, the certain range of the ratio of A1/A2 is defined by $1/2.2 \leq A1/A2 \leq 2.2$. Plate thickness t1 of plates forming the refrigerant heat-exchanging portion and plate thickness t2 of plates of the evaporating portion have a relationship that a ratio t1/t2 is set within a range of $0.17 \leq t1/t2 \leq 0.75$.

7 Claims, 6 Drawing Sheets

FIG. I

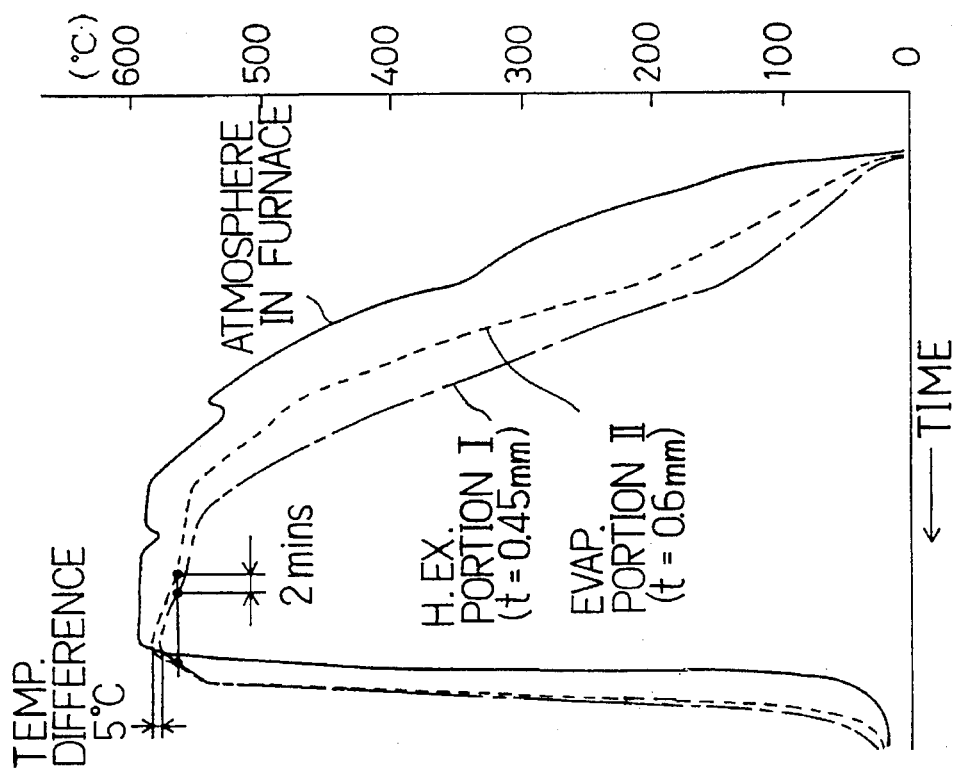
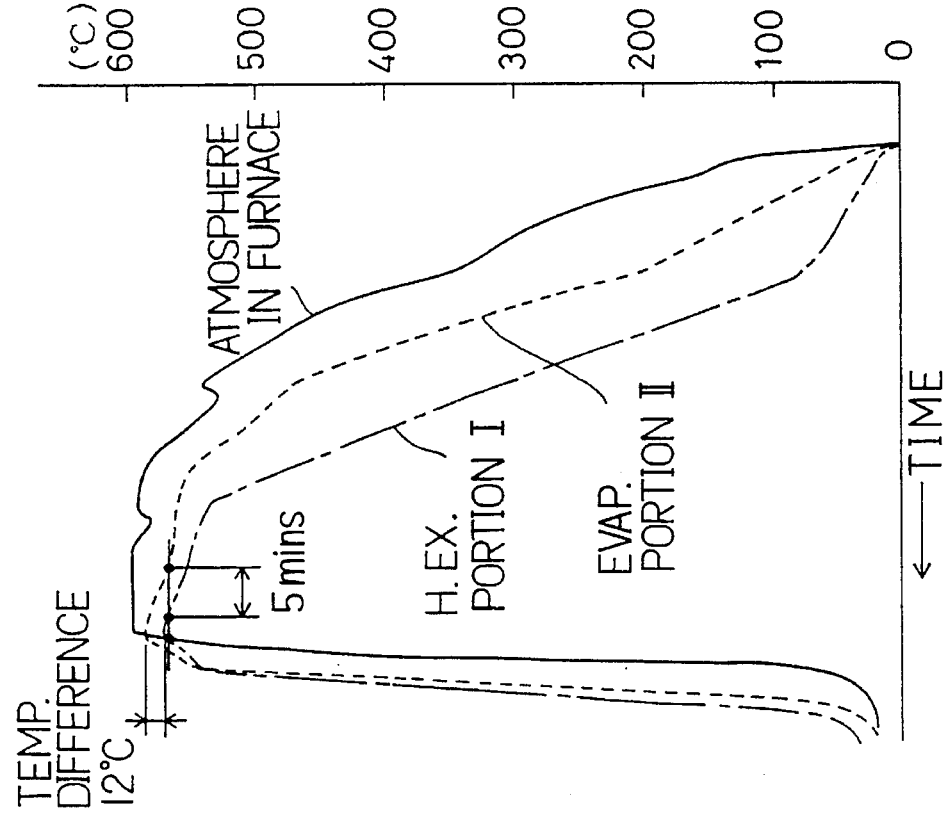

HEAT EXCHANGER

CROSS REFERENCE TO RELATED APPLICATION

This application is based upon and claims priority from Japanese Patent Application No. 6-237326 filed Sep. 30, 1994, the contents of which are incorporated herein by reference.

BACKGROUND OF THE INVENTION

1. Field of the Invention

The present invention relates to a heat exchanger, for example a heat exchanger of laminate type or the like employed in a refrigeration cycle or the like of an automotive air-conditioning apparatus or the like.

2. Description of the Related Art

Generally, components forming a refrigeration cycle of an automotive air-conditioning apparatus are provided with a compressor, condenser, receiver, expansion valve, evaporator, and so on, and perform heat exchange with refrigerant of the evaporator and air in a passenger-compartment to cool a passenger compartment by circulating refrigerant in this sealed circuit. Accordingly, in this refrigeration cycle, refrigerant which has passed through the expansion valve becomes gas-liquid two phase and is introduced into the evaporator. In the evaporator, the refrigerant absorbs heat from external air and is vaporized (evaporated) thereat, continues isothermal expansion and performs a cooling effect for air in the passenger-compartment, and thereafter this expanded refrigerant becomes superheated vapor and is introduced into the compressor.

Additionally, in recent years a heat exchanger of laminate type has been developed from the standpoint of heat-exchanging performance and the like as a device utilized in the above-described refrigeration cycle. As shown in U.S. Pat. No. 5,245,843 (corresponding to Japanese Patent Application Laid-open No. 5-19632), the heat exchanger has a first and second heat-exchange portions. The first heat-exchange portion is formed by laminating thin plates which forms passages therein. The second heat-exchange portion is formed by laminating thin plates which forms passages therein and corrugated fins. The heat exchanger is provided with the first heat-exchange portion to heat exchange between the refrigerant of a refrigerant inlet path and the refrigerant of an outlet path, the second heat-exchange portion having a plurality of evaporation passages to heat exchange between the refrigerant and air in the compartment, and a fixed needle valve disposed between the refrigerant inlet path and the second heat-exchange portion, and so on. Accordingly, heat exchange between refrigerant and air in the compartment is performed by distributing and supplying refrigerant to the passages to the second heat-exchange portion via the needle valve, and along with this, mutual heat exchange between refrigerant is performed between refrigerants of different temperature to flow to the proximately arranged refrigerant inlet path and refrigerant outlet path in the first heat-exchange portion.

In producing the heat exchanger, comparing the constitution of the first heat-exchange portion and the second heat-exchange portion, the first heat-exchange portion is dense in material volume, and the second heat-exchange portion is coarse in material volume because corrugated fins are formed between thin plates. Therefore, when the heat exchanger having two parts of which density is different is brazed in a furnace, there is a problem. Setting the time and the temperature in the furnace to fit for the first heat-exchange portion which is dense (This means large thermal capacity.), fins in the second heat-exchange portion begins to melt when brazing of the first heat-exchange portion is completed. On the other hand, setting the time and the temperature in the furnace to fit for the second heat-exchange portion which is coarse (This means small thermal capacity.), the state of brazing in the first heat-exchange portion is incomplete when the brazing of the second heat-exchange portion is completed.

SUMMARY OF THE INVENTION

To solve the above problem, the object of the present invention is to provide a heat exchanger having a first and second heat exchange portions one of which heat exchange portion has thinner thin plates in thickness to equal the heat capacity.

In one preferred mode of the present invention, a heat exchanger for use in a refrigerant cycle for refrigerant includes a joint block, a first heat-exchanging portion and a second heat-exchanging portion. The joint block has an inlet for introducing the refrigerant and an outlet for discharging the refrigerant. The first heat-exchanging portion is formed from a plurality of stacked plates and having a first passage communicating with the inlet and a second passage communicating with the outlet. The first and second passages perform heat exchange each other. The second heat-exchanging portion is formed from a plurality of stacked plates and a plurality of fins. An adjacent pair of the plates form a third passage for the refrigerant therein. The plurality of fins arranged between the adjacent pair of the plates. The refrigerant in the third passage performs heat exchange with an air outside of the second heat-exchanging portion.

A thickness of the plates forming the first heat-exchanging portion is thinner than a thickness of the plates forming the second heat-exchanging portion, so that the first heat-exchanging portion and said second heat-exchanging portion are brazed together integrally.

Preferably, a ratio of thickness of the plates between the first heat-exchanging portion and the second heat-exchanging portion is within a certain range.

Preferably, the certain range of the ratio is greater than and equal to 0.17 and less than and equal to 0.75.

Preferably, a reference volume of a portion is a volume of the portion providing a predetermined amount of heat-receiving surface area of the portion, an index A of the portion is defined by A=(volume of material of the portion to be heated existing in a reference volume of the portion)/(the reference volume of the portion), and a ratio of an index A1 which is the index A of the first portion and an index A2 which is the index A of the second portion, i.e., A1/A2 is set within a certain range.

Preferably, the certain range of the ratio of A1/A2 is defined by $1/2.2 \leq A1/A2 \leq 2.2$.

BRIEF DESCRIPTION OF THE DRAWINGS

FIG. 6A is a graph indicating temperature change of heat exchangers of the present invention according to a second experiment; and FIG. 6B is a graph indicating temperature change of heat exchangers of comparative embodiment according to a second experiment.

DETAILED DESCRIPTION OF THE PREFERRED EMBODIMENT

Figure 2:
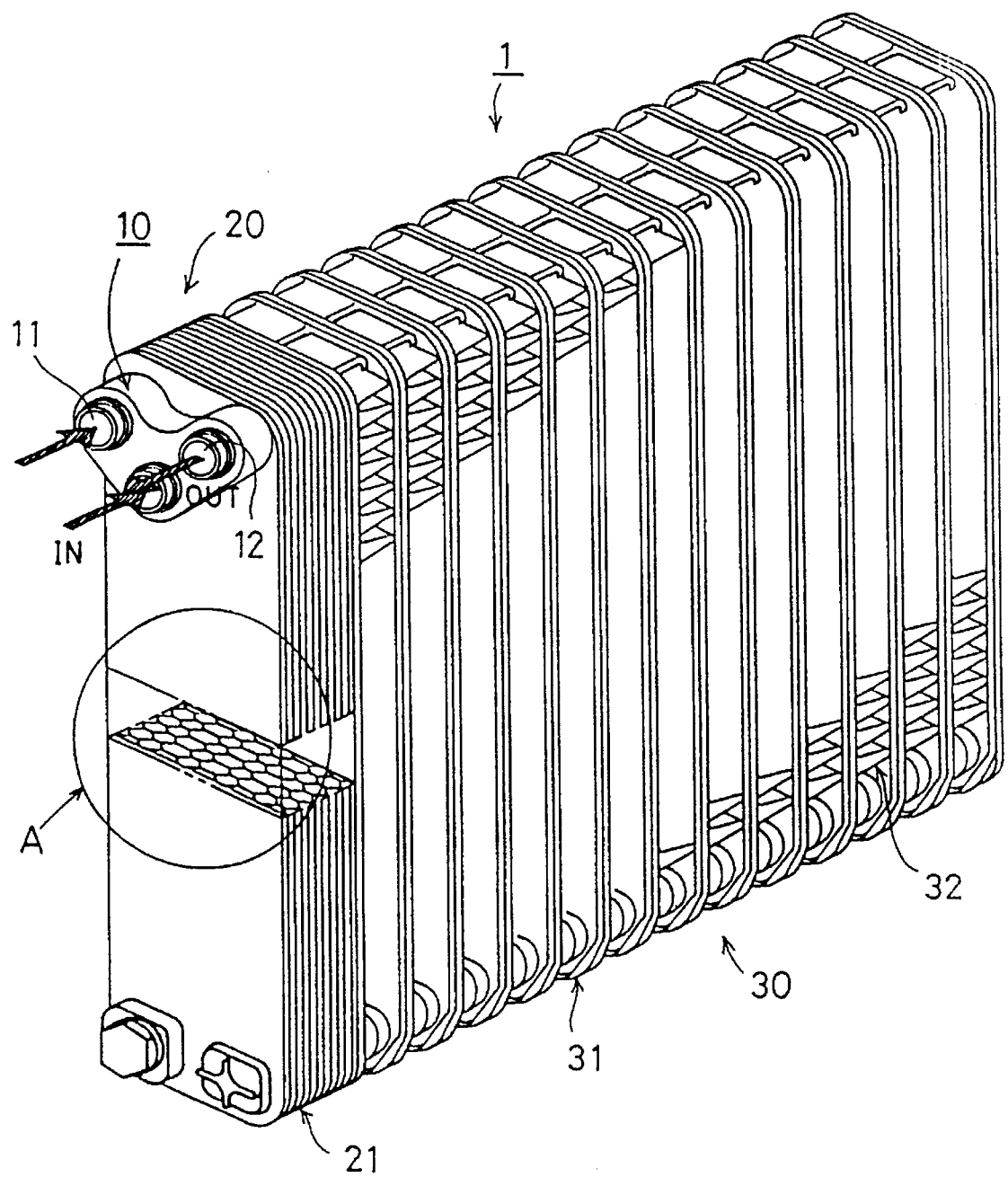
FIG. 2 is a partial cutaway perspective view indicating the heat exchanger according to the present invention.

A favorable embodiment of a heat exchanger according to the present invention will be described hereinafter to clarify the structure and mode of operation of the present invention described above. FIG. 2 is a partial cutaway perspective view indicating a laminate type heat exchanger, and FIG. 3 indicates an expanded view taken along line A of FIG. 2.

A laminate type heat exchanger (hereinafter termed simply "heat exchanger") according to the present embodiment is employed in for example a refrigeration cycle for automotive use, and is a plurality of integrally brazed and joined laminated plates.

Figure 3:
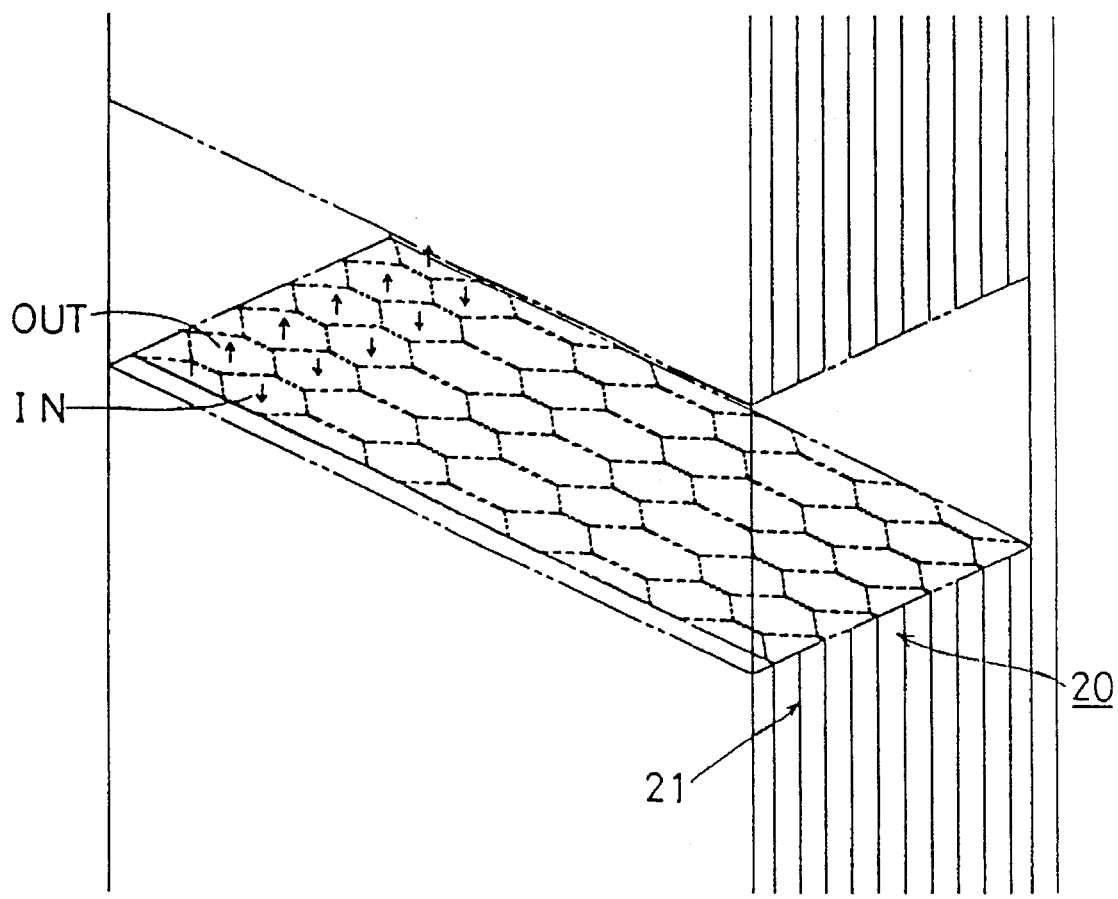
FIG. 3 is a partial cutaway expanded perspective view indicating an area A in FIG. 2 of the heat exchanger.

As shown in FIGS. 2 and 3, a heat exchanger 1 includes a joint block 10 which is connected to piping of the refrigeration cycle and introduces refrigerant as well as sending refrigerant to outside the heat exchanger 1 after vaporization, a refrigerant heat-exchanging portion (first heat-exchanging portion) 20 which heat exchanges between refrigerants, and an evaporating portion (second heat-exchanging portion) 30 which heat exchanges between refrigerant and air in the compartment.

An intake port 11 which becomes an entrance for refrigerant in a two-phase state which has been discharged from an expansion valve not illustrated and a discharge port 12 which sends refrigerant after evaporation are disposed on the foregoing joint block 10.

Figure 4A:
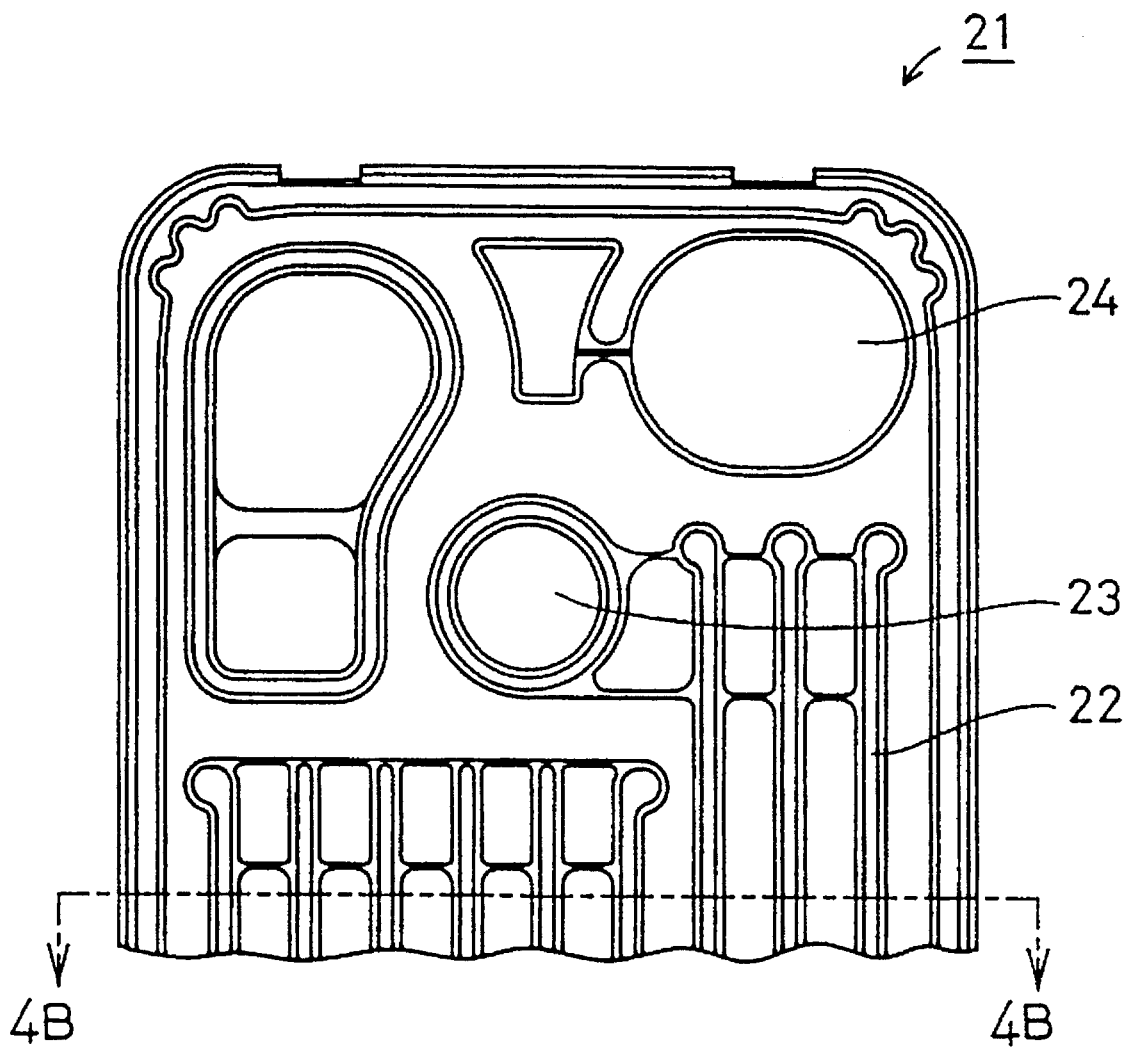
FIG. 4A a partially cutaway front view showing a plate of a refrigerant heat-exchanging portion.
Figure 4B:
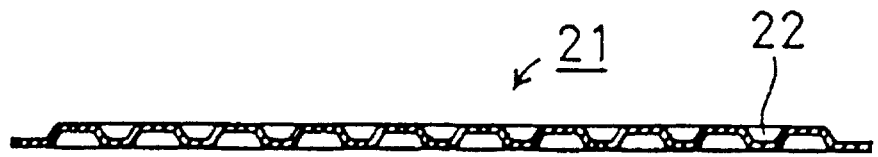
FIG. 4B is a sectional view taken along line 4B—4B thereof.

The foregoing refrigerant heat-exchanging portion 20 is formed by laminating a plurality of plates (tube plates) 21 of planar configuration by brazing, and is structured so as to allow refrigerant to flow between laminated plates 21. As shown in FIGS. 4A and 4B, the plates 21 are formed with concave and convex portions on plates so that refrigerant passages are formed when laminated. A plurality of grooves 22 which become passages are formed vertically in the center of the plates 21, and holes 23 and 24 through which refrigerant flows are created in the upper and lower edges of the plates.

Figure 5A:
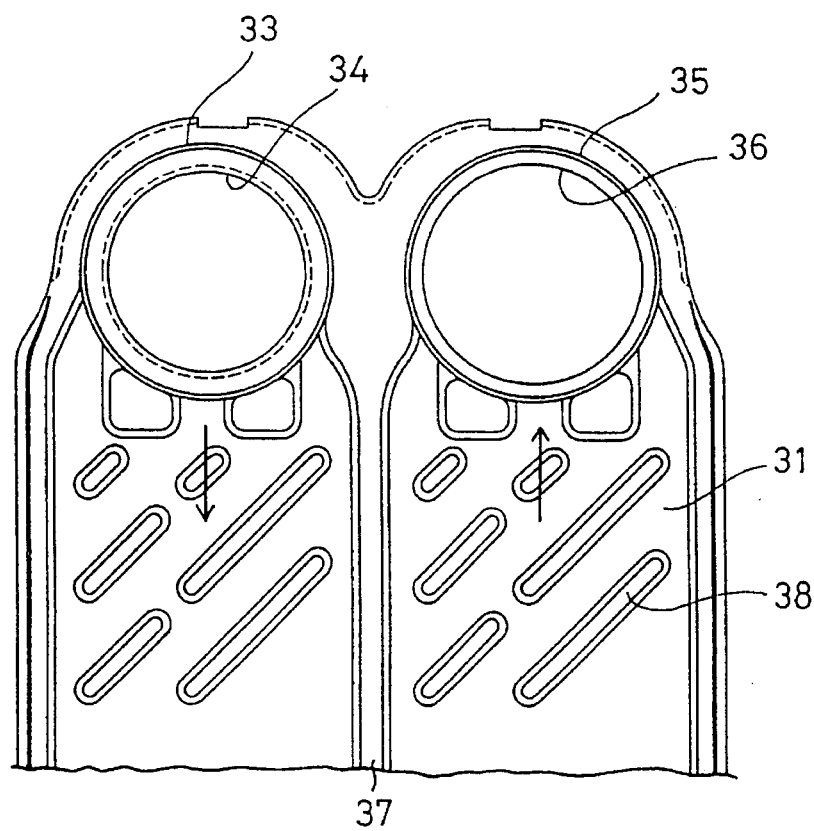
FIG. 5A is a partially cutaway front view showing a plate of an evaporating portion.
Figure 5B:
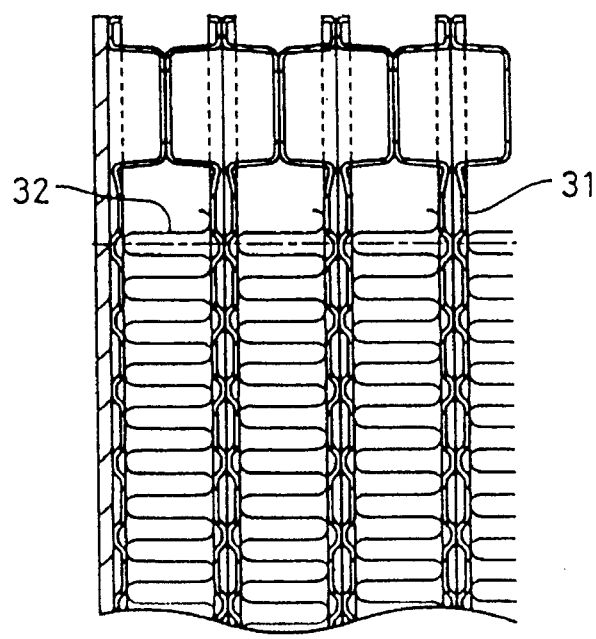
FIG. 5B is an explanatory drawing indicating a laminated state thereof.

In the foregoing evaporating portion 30, plates 31 having concave and convex portions differing from the plates 21 of the above-described refrigerant heat-exchanging portion 20 and corrugated fins 32 (hereinafter termed "fins 32") of corrugated-plate configuration to efficiently cool air in the compartment are laminated by brazing. That is to say, as shown in FIGS. 5A and 5B, the plates 31 are of a approximately rectangular planar configuration, and a hole 34 which becomes an entry tank 33 of tubular configuration and a hole 36 which becomes an exit tank 35 are formed in an upper portion thereof. Additionally, a center portion of these plates 31 is depressed with respect to a protruding outer periphery so that passages for refrigerant are formed between the plates 31 when laminated, and a plurality of protruding cross-ribs 38 are formed on two sides of a protruding partition 37 of this center portion.

The present invention was obtained as a result of experimentation and research of conditions where favorable brazing of the heat exchanger is possible with no occurrence of brazing defects, with a focus on thermal capacity of the heat exchanger.

The inventors found a new index A which is useful for checking whether integral brazing of the heat exchanger having different material density in different portions are possible or not through the experimentation and the research. The index A is defined as follows;

A reference volume of a portion is a volume of the portion providing a predetermined amount of heat-receiving surface area of the portion,

EQUATION 1

INDEX $A$ = (volume of material of the portion to be heated existing in the reference volume of the portion)/(the reference volume of the portion)

The inventors experimented to know an area satisfying integral brazing. To obtain such data, the inventors checked the relationship between (index A1 of the first heat-exchanging portion/index A2 of the second heat-exchanging portion) and (thickness t1 of the member of the first heat-exchanging portion/thickness t2 of the member of the second heat-exchanging portion). Several data are shown as follows.

1. When A1/A2=2.8, i.e., t1/t2=1.0: failure of brazing
2. When A1/A2=2.3, i.e., t1/t2=0.83 wherein t1=0.5 mm and t2=0.6 mm: failure of brazing
3. When A1/A2=1.8, i.e., t1/t2=0.67 wherein t1=0.4 mm and t2=0.6 mm: success of brazing
4. When A1/A2=2.2, i.e., t1/t2=0.75 wherein t1=0.45 mm and t2=0.6 mm: success of brazing by adjusting brazing condition Through the above experiments, the inventors noticed that critical point is around at A1/A2=2.2, i.e., t1/t2=0.75. To obtain a lower limit value of A1/A2, inverse number was adopted, i.e., lower limit value is 1/2.2. This corresponds to t1/t2=0.17.

Figure 1:
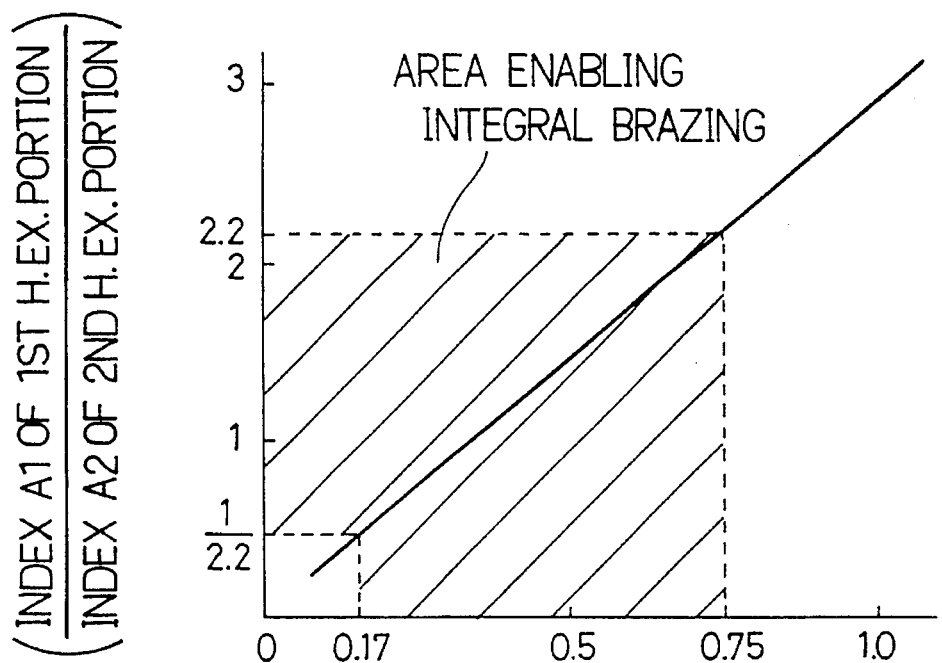
FIG. 1 is an explanatory graph showing a principle of a heat exchanger according to the present invention.

As a result, the linear relationship between (index A1 of the first heat-exchanging portion/index A2 of the second heat-exchanging portion) and (thickness t1 of the member of the first heat-exchanging portion/thickness t2 of the member of the second heat-exchanging portion) is shown in FIG. 1. The hatched area is an area enabling integral brazing. That is to say, according to the present invention, a favorable range for integral brazing is taken to be a range in which the ratio A1/A2 of the indexes is $1/2.2 \leq A1/A2 \leq 2.2$; converted to member thickness, this corresponds to a range in which the ratio t1/t2 of member thickness is $0.17 \leq t1/t2 \leq 0.75$. Briefly, it becomes possible to favorably integrally braze the heat exchanger at a predetermined temperature if within this range.

Furthermore, in a case where the ratio A1/A2 of the foregoing indexes exceeds 2.2 (i.e., in a case where the ratio t1/t2 of member thickness exceeds 0.75), the high-temperature state of the second heat-exchanging portion becomes excessively lengthy, the tube plates themselves melt, and the product is adversely affected in a case where the temperature condition of the first heat-exchanging portion has been adopted, and conversely, in a case where the temperature condition of the second heat-exchange portion has been adopted, the first location becomes partially melted and internal brazing cannot be performed sufficiently, which is undesirable. Meanwhile, in a case where the ratio A1/A2 of the foregoing indexes falls below 1/2.2 (i.e., in a case where the ratio t1/t2 of member thickness falls below 0.17), the second heat-exchanging portion becomes partially melted and internal brazing cannot be performed sufficiently in a case where the temperature condition of the first heat-exchanging portion has been adopted, and in a case where the temperature condition of the second heat-exchanging portion has been adopted, the high-temperature state of the first heat-exchanging portion becomes excessively lengthy, the tube plates themselves melt, and the product is adversely affected, which is undesirable.

Additionally, index A1 of the first heat-exchanging portion and index A2 of the second heat-exchanging portion respectively indicate a proportion of material of the first heat-exchanging portion and a proportion of material of the second heat-exchanging portion at a predetermined capacity. Moreover, the foregoing reference volume is identical with the numerator and denominator of the foregoing equation (1), and signifies a volume which becomes a predetermined reference.

In the first embodiment of the present invention, plate thickness t1 of the plates 21 making up the above-described refrigerant heat-exchanging portion 20 in particular is established to be 0.4 mm, and plate thickness t2 of the plates 31 of the evaporating portion 30 is established to be 0.6 mm. That is to say, the ratio t1/t2 (=approximately 0.67) of the plate thicknesses t1 and t2 of the two of plates 21 and 31 is established within a range of $0.17 \leq t1/t2 \leq 0.75$. Additionally, the material of the two plates 21 and 31 is aluminum alloy (for example A3003 defined in Japanese Industrial Standard), and brazing material composed of for example A4104 defined in Japanese Industrial Standard is formed in a thin-film configuration (thickness: 15% of both surfaces) on surfaces thereof.

Consequently, in a case of fabricating the heat exchanger 1 according to the present embodiment, the foregoing two plates 21 and 31 are laminated and the refrigerant heat-exchanging portion 20 and evaporating portion 30 are assembled, and along with this, the joint block 10 is installed on the refrigerant heat-exchanging portion 20, and the apparatus is fixed in a fixture not illustrated and heated as-is in a furnace. As heating conditions for this, temperature is raised to a brazing temperature of 572° C. for approximately 40 minutes, thereafter maintained at a state of this temperature or more for approximately 5 minutes, and thereafter cooled. Brazing material of the two plates 21 and 31 and so on is melted and hardened thereby, and integral brazing of the heat exchanger 1 is completed.

In this way, according to the present embodiment, the ratio t1/t2 of the plate thickness t1 of the plates 21 of the refrigerant heat-exchanging portion 20 and the plate thickness t2 of the plates 31 of the evaporating portion 30 is established to be 0.4/0.6=approximately 0.67, which is within the favorable range of $0.17 \leq t1/t2 \leq 0.75$, and so in a case where heating condition have been established as described above, adequate melting of brazing material can be performed and moreover a marked effect is demonstrated in which heating insufficiency does not occur. Accordingly, there is no excessive heating and melting of the plates themselves, and there is no occurrence of shorting of the refrigerant passages known as "short circuit" due to a brazing defect such as partial melting, as in the prior art.

Experimentation performed to confirm the effect of the present embodiment will be described hereinafter.
(First Experiment)

This experiment determined a material ratio in a refrigerant heat-exchanging portion and evaporating portion by calculation.

Concretely, thicknesses of plates of a refrigerant heat-exchanging portion and evaporating portion were made identical as a comparative example, and a material ratio of the refrigerant heat-exchanging portion and evaporating portion in an identical volume in this case was determined. Additionally, a material ratio of the refrigerant heat-exchanging portion and evaporating portion of differing plate thicknesses according to the present embodiment in an identical volume was determined. The results thereof are indicated in Table 1 below.

TABLE 1

| | Location | Plate thickness | Material ratio in an identical volume | Ratio A1/A2 of indexes |
|---|---|---|---|---|
| EMBODIMENT | Refrigerant heat-exchanging portion | t1 = 0.4 mm | A1 = 28% | 1.9 |
| | Evaporating portion | t2 = 0.6 mm | A2 = 15% | |
| COMPARATIVE EXAMPLE | Refrigerant heat-exchanging portion | t1 = 0.6 mm | | 2.8 |
| | Evaporating portion | t2 = 0.6 mm | A2 = 15% | |

As is clear from Table 1, in a case where the plate thickness of the refrigerant heat-exchanging portion has been changed to a thinner plate thickness of 0.4 mm, as in the embodiment, the ratio occupied by the foregoing material (index A1) decreases from 42% to 28%. That is to say, the ratio A1/A2 of the above-described indexes is changed from 2.8 (=42%/15%) to approximately 1.9 (=28%/15%). It is understood that the ratio A1/A2 of the indexes comes to be within the range of not less than 1/2.2 (approximately 0.45) and not more than 2.2 which is a favorable range for brazing, and favorable brazing is possible thereby.

In contrast to this, it is understood that, according to the comparative example, the ratio A1/A2 of the above-described indexes is 2.8, which is outside the favorable range for brazing.
(Second Experiment)

In this experiment, heat exchangers of the embodiment and the comparative example were assembled, actually heated and brazed, and temperature change and so on of respective locations at the time thereof were measured and the brazing state was observed.

In specific terms, as the embodiment, plate thickness of the plates of the refrigerant heat-exchanging portion was set to be 0.45 mm but the other plate thickness was set to be identical with the above-described first experiment (0.6 mm). Accordingly, the heat exchangers of the embodiment and the comparative example were placed in a furnace and gradually heated, and along with this, the furnace temperature and the temperature of the refrigerant heat-exchanging portion and evaporating portion were measured. The results of this are shown in FIGS. 6A and 6B.

As is clear from FIG. 6A indicating the embodiment, in the heat exchanger of the embodiment, examination of the 572° C. at which the brazing material melts reveals that after the evaporating portion II reaches 572° C., the refrigerant heat-exchanging portion I reaches 572° C. only 2 minutes later. Thereafter, the temperature differential of the evaporating portion II and refrigerant heat-exchanging portion I varies with an interval of only 5° C., and is maintained at the brazing-material melting temperature or more for the approximately 3 minutes until the refrigerant heat-exchanging portion I becomes 572° C. or less.

That is to say, in a case of the heat exchanger of the embodiment, melting of the brazing material begins at substantially the same timing for the evaporating portion II and refrigerant heat-exchanging portion I, and the brazing material is maintained in a melted state for a lengthy time. As a result thereof, the brazing material sufficiently extends to required areas, and so unevenness in brazing is eliminated, and short circuit is prevented. Additionally, it is understood that because the evaporating portion II is not heated excessively during the interval until the refrigerant heat-exchanging portion I reaches 572° C., damage due to melting of the plates can be prevented.

Meanwhile, as is clear from FIG. 6B indicating the comparative example, in the heat exchanger of the comparative example, similar examination of the 572° C. at which the brazing material melts reveals that after the evaporating portion II reaches 572° C., the refrigerant heat-exchanging portion I reaches 572° C. after 5 minutes have elapsed. Thereafter, the temperature differential of the evaporating portion II and refrigerant heat-exchanging portion I varies with an interval of 12° C. which is a large temperature differential, and is maintained at the brazing-material melting temperature or more for only a short time until the refrigerant heat-exchanging portion I becomes 572° C. or less.

That is to say, in a case of the heat exchanger of the comparative example, even after the evaporating portion II has reached the melting temperature of the brazing material, the refrigerant heat-exchanging portion I does not reach the temperature thereof for a long interval, and to cause the refrigerant heat-exchanging portion I to be brazeable it is necessary for the evaporating portion II to continue to the high-temperature interval excessively, and so the plates are damaged. Moreover, it is understood that when the heating time is shortened to suppress this damage, the refrigerant heat-exchanging portion I comes to drop in temperature in only a short interval after the melting temperature of the brazing material is reached, and so the brazing material is not melted sufficiently with regard to the refrigerant heat-exchanging portion I, unevenness in brazing occurs, and a brazing defect results.

An embodiment according to the present invention was described above, but the present invention is in no way exclusively limited to such an embodiment, and may of course be embodied in any of a variety of modes which do not deviate from the essence of the present invention.

As has been described in detail above, in an invention, a ratio (A1/A2) of an index A1 of a first location and an index A2 of a second location is a range of not less than 1/2.2 and not more than 2.2, and so favorable brazing for both of the two locations can be performed in a case where brazing at a predetermined brazing temperature is performed. That is to say, a marked effect is demonstrated in that a favorable heat exchanger with no partial melting or damage due to excessive heating and in which short circuit or the like does not occur can easily be fabricated, even in a case of integral brazing.

A ratio (t1/t2) of plate thickness t1 of a member forming a first location and plate thickness t2 of a member forming a second location is a range of not less than 0.17 and not more than 0.75, and so favorable brazing for both of the two locations can be performed.

Integral brazing can be performed favorably for a heat exchanger provided with a first heat-exchanging portion which performs heat exchange between refrigerant and refrigerant and a second heat-exchanging portion which performs heat exchange between refrigerant and external ambient air.

Integral brazing can favorably be performed for a heat exchanger of laminate type formed by laminating tube plates.

What is claimed is:

1. A heat exchanger for use in a refrigerant cycle for refrigerant, comprising:

a joint block having an inlet for introducing the refrigerant and an outlet for discharging the refrigerant;

a first heat-exchanging portion formed from a plurality of stacked plates and having a first passage communicating with said inlet and a second passage communicating with said outlet, said first and second passages performing heat exchange with each other; and a second heat-exchanging portion formed from a plurality of stacked plates and a plurality of fins, a pair of said plates forming a third passage therebetween for the refrigerant therein, said plurality of fins arranged between an adjacent pair of said plates, the refrigerant in said third passage performing heat exchange with an air outside of said second heat-exchanging portion, wherein a thickness of said plates forming said first heat-exchanging portion is less than a thickness of said plates forming said second heat-exchanging portion, whereby said first heat-exchanging portion and said second heat-exchanging portion can be integrally brazed.

2. A heat exchanger according to claim 1, wherein a ratio of thickness of said plates between said first heat-exchanging portion and said second heat-exchanging portion is within a certain range.

3. A heat exchanger according to claim 2, wherein said certain range of said ratio is greater than or equal to 0.17 and less than or equal to 0.75.

4. A heat exchanger according to claim 3, wherein said heat exchanger is a laminate type, said first heat-exchanging portion and second heat-exchanging portion are formed by laminating tube plates, said first heat-exchanging portion and second heat-exchanging portion are directly bonded.

5. A heat exchanger according to claim 1, wherein a reference volume of a portion is a volume of said portion providing a predetermined amount of heat-receiving surface area of said portion, an index A of said portion is defined by A=(volume of material of said portion to be heated existing in a reference volume of said portion)/(said reference volume of said portion), and a ratio of an index A1 which is said index A of said first portion and an index A2 which is said index A of said second portion, i.e., A1/A2 is set within a predetermined range.

6. A heat exchanger according to claim 5, wherein said predetermined range of said ratio of A1/A2 is defined by $1/2.2 \leqq A1/A2 \leqq 2.2$.

7. A heat exchanger according to claim 6, wherein said heat exchanger is a laminate type, said first heat-exchanging portion and second heat-exchanging portion are formed by laminating tube plates, said first heat-exchanging portion and second heat-exchanging portion are directly bonded.

* * * * *